(12) United States Patent
Yeh et al.

(10) Patent No.: US 7,006,175 B2
(45) Date of Patent: Feb. 28, 2006

(54) COLOR FILTER AND METHOD FOR MANUFACTURING THE SAME

(75) Inventors: Sheng-Shiou Yeh, Miao-Li (TW); Jia-Pang Pang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 34 days.

(21) Appl. No.: 10/788,748

(22) Filed: Feb. 27, 2004

(65) Prior Publication Data

US 2004/0169795 A1 Sep. 2, 2004

(30) Foreign Application Priority Data

Feb. 27, 2003 (TW) .............................. 92104339 A

(51) Int. Cl.
*G02F 1/1335* (2006.01)

(52) U.S. Cl. .......................... 349/106; 349/96; 349/97; 349/98

(58) Field of Classification Search ............ 349/96–98, 349/106
See application file for complete search history.

(56) References Cited

U.S. PATENT DOCUMENTS

| 2,699,706 | A | * | 1/1955 | Boone ........................ 359/498 |
| 5,340,619 | A | * | 8/1994 | Chen et al. ................. 427/498 |
| 5,786,042 | A | | 7/1998 | Inoue et al. |
| 6,242,140 | B1 | | 6/2001 | Kwon et al. |
| 6,259,505 | B1 | * | 7/2001 | Makino ...................... 359/153 |
| 6,399,166 | B1 | | 6/2002 | Khan et al. |
| 6,583,284 | B1 | | 6/2003 | Sidorenko et al. |
| 6,645,029 | B1 | | 11/2003 | Akahira |
| 2001/0026335 | A1 | * | 10/2001 | Moon .......................... 349/63 |
| 2002/0033927 | A1 | * | 3/2002 | Mun et al. .................. 349/156 |

\* cited by examiner

*Primary Examiner*—Robert Kim
*Assistant Examiner*—(Nancy) Thanh-Nhan P. Nguyen
(74) *Attorney, Agent, or Firm*—Wei Te Chung

(57) ABSTRACT

A color filter and a method for manufacturing the same are provided. The color filter includes a polarizer matrix (202), which is patterned in accordance with the pixel arrangement of a liquid crystal display device. The polarizer matrix (202) is made of a thin crystal film material, which may linearly polarize incident light along one direction. By incorporating with a polarizer film (206), the polarizer matrix (202) becomes an effective black matrix. A thinner black matrix may thus be produced, and the manufacturing processes of the color filter are simplified.

11 Claims, 1 Drawing Sheet

COLOR FILTER AND METHOD FOR MANUFACTURING THE SAME

BACKGROUND OF THE INVENTION

1. Field of the Invention

The present invention relates generally to color filters and method for manufacturing the same, and more particularly, to color filters and method for manufacturing the same for liquid crystal display devices.

2. Prior Art

Liquid crystal display (LCD) devices, especially color LCD devices have many applications. For example, the color LCD devices are applicable in laptop computers, DVD players, cellular phones, personal digital assistants (PDA), etc. In order to make an LCD display colorful, a color filter is needed.

FIG. 1 illustrates a conventional color filter 100, which comprises a substrate 101, a black matrix (BM) 102, a red, green and blue color filter layer 103a, 103b and 103c, a protection layer 104, and a transparent conductive layer 105.

Methods for manufacturing the color filter 100 include pigment dispersion method, dyeing method, printing method and electrodeposition method. Regardless of which of the above methods is employed, a black matrix (BM) should be formed on a substrate before further processing for preventing leakage of light due to liquid crystal alignment defects.

Conventionally, a black matrix is formed on a glass substrate by photolithography. The black matrix is generally comprised of a thin metal film, such as a chromium film, with a fine pattern. The black matrix is formed by first sputtering a thin metal film on a substrate in a vacuum environment. Then, a photoresist is applied on the thin metal film. A pattern is formed on the photoresist for defining the pattern of the thin metal film. The thin metal film is then etched in accordance with the pattern formed on the photoresist. The desired black matrix is thus formed after depleting the photoresist on the thin metal film. This photolithography method requires many processing steps, resulting in a higher production cost.

Another conventional method for forming a black matrix is disclosed by Keijiro Inoue, et al. in U.S. Pat. No. 5,786,042, which is entitled "Resin Black Matrix for Liquid Crystal Display Device". However, the formation of a resin black matrix on a substrate still requires photolithography processes. In addition, the resin black matrix is approximately 1 μm or more in thickness, which reduces the flatness of a color filter.

SUMMARY OF THE INVENTION

In accordance with the above and other reasons, one objective of the present invention is to provide a color filter having a thinner black matrix.

Another objective of the present invention is to provide a method for manufacturing a color filter, which requires fewer processing steps.

Accordingly, to achieve the above objectives, the color filter of the present invention comprises a substrate, a polarizer matrix formed on one surface of the substrate defining a plurality of openings, and a color filter layer formed on the substrate in the openings of the polarizer matrix, wherein the polarizer matrix is made of a thin crystal film material. One may determine the polarization direction of the polarizer matrix by robbing or applying a stress force, or gravitational or electromagnetic fields on the polarizer matrix. The color filter layer formed in each of the openings of the polarizer matrix is a red light filter, a green light filter, or a blue light filter. In order to protect the color filter layer, a protective layer covering the polarizer matrix and the color filter layer may be formed. A transparent conductive material such as indium-tin-oxide (ITO) may further be formed on the protective layer, acting as the common electrode of a liquid crystal display device. On another surface of the substrate, a polarizer film has a polarization direction perpendicular to that of the polarizer matrix is formed. Since the polarization directions of the polarizer film and the polarizer matrix are perpendicular to each other, light transmitted through the polarizer matrix is not permitted to transmit through the polarizer film, thus forming an effective black matrix.

DETAILED DESCRIPTION OF THE INVENTION

Figure 1:
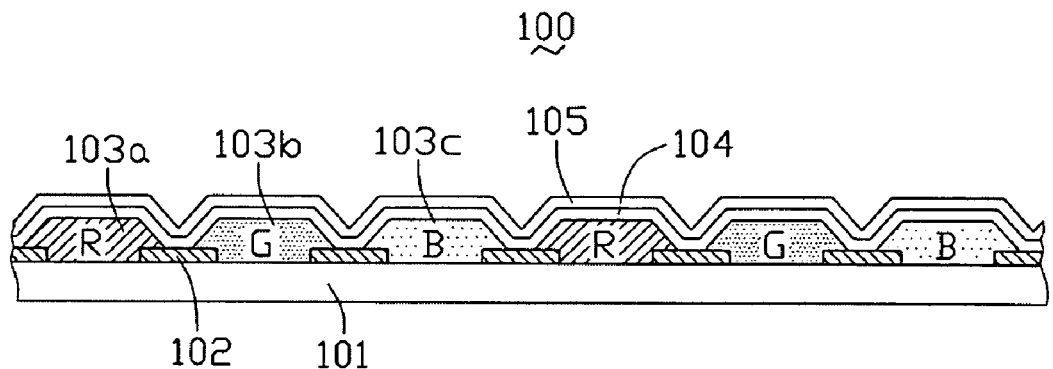
FIG. 1 illustrates a cross-sectional view of a conventional color filter.
Figure 2:
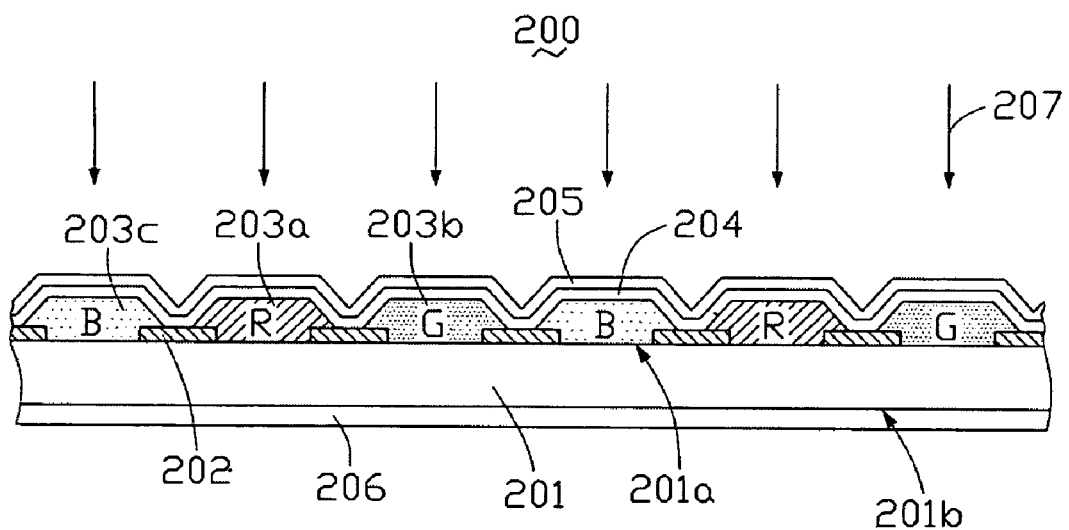
FIG. 2 illustrates a cross-sectional view of a color filter of the present invention.

Referring to FIG. 2, a color filter 200 of the present invention is illustrated. The color filter 200 comprises a substrate 201, a polarizer matrix 202, red, green and blue color filter layers 203a, 203b and 203c, a protective layer 204, a transparent conductive layer 205, and a polarizer film 206.

The substrate 201 is a thin transparent slab made of glass or any transparent polymeric material such as acrylic. A layer of polarizer matrix 202 with a pattern is formed on the substrate 201. In accordance with one embodiment of the present invention, the polarizer matrix 202 is made of a thin crystal film material such as the commercially available Optiva TCF™ material, developed by Optica Inc. of California, with a thickness of 0.5 μm or less. The polarizer matrix 202, capable of producing linearly polarized light, has a first polarization direction determined by robbing or applying a stress force, or gravitational or electromagnetic fields thereon. In general, the pattern of the polarizer matrix 202 follows the pixel arrangement of the liquid crystal display device. Among them, the most commonly used pixel arrangements include stripe arrangement, delta arrangement, mosaic arrangement, and square arrangement. In this particular embodiment of the present invention, the pixel arrangement is a stripe arrangement. The pattern of the polarizer matrix 202 defines a plurality of openings exposing the first surface 201a of the substrate 201. The method for printing thin crystal film material on the first surface 201a of the substrate 201 to form the polarizer matrix 202 is disclosed in, for example, U.S. Pat. No. 6,583,284, a detailed discussion of which is thus omitted. The substrate 201, on which the polarizer matrix 202 has been formed, is then cured in an oven with a temperature ranging from 180° C. to 250° C.

The red, green and blue color filter layers 203a, 203b and 203c are subsequently deposited in the corresponding openings of the polarizer matrix 202 on the first surface 201a of the substrate 201. In this particular embodiment of the present invention, the red, green and blue color filter layers 203a, 203b and 203c are deposited by a pigment dispersion method. There are, however, other methods for depositing color filter layers 203a, 203b and 203c, such as a dyeing method, a printing method, and an electrodeposition method. Since the present invention is defined in the accompanying claims, any color filter having the disclosed features of the present invention is considered within the scope of the present invention regardless of the manufacturing method of the color filter layers employed.

The protective layer 204 and the transparent conductive layer 205 are then subsequently formed on the substrate, on which the color filter layers 203a, 203b and 203c have been formed. The transparent conductive layer 205 may be formed directly on the color filter layers 203a, 203b and 203c without the protective layer 204. In this particular embodiment, the protective layer 204 is made of polymeric material such as epoxy and acrylic, while the transparent conductive layer 205 is made of transparent metallic materials such as indium-tin-oxide (ITO). Since the methods for forming the protective layer 204 and the transparent conductive layer 205 are know in the art, detailed descriptions of which is thus omitted.

The polarizer film 206 is formed on the second surface 201b of the substrate 201, which is capable of producing linearly polarized light. The polarizer film 206 may be composed of the same thin crystal film material as that of the polarizer matrix 202. However, other optically anisotropic materials such as polyvinyl alcohol (PVA) may also be employed. In addition, the polarization direction of the polarizer film 206 is chosen to be perpendicular to the polarization direction of the polarizer matrix 202. Therefore, light incident from direction 207 is partly linearly polarized by the polarizer matrix 202 and partly color filtered to each of the corresponding colors of the color filter layers 203a, 203b and 203c. By incorporating with the polarizer film 206, the linearly polarized part of the incident light is sufficiently blocked by the polarizer film 206, resulting in an effective black matrix (BM) of the color filter 200.

In summary, the method for manufacturing a color filter 200 of the present invention includes the following steps: providing a substrate 201 having a first surface 201a and a second surface 201b; forming a polarizer matrix 202 on the first surface 201a of the substrate 201 and defining a plurality of openings; applying a stress force, or gravitational or electromagnetic fields on the polarizer matrix 202 so as to obtain a first polarization direction of the polarizer matrix 202; curing the substrate 201 on which a polarizer matrix 202 has been formed in an oven; forming red, green and blue color filter layers 203a, 203b and 203c on the substrate 201 in the openings of the polarizer matrix 202; forming a protective layer 204 covering the color filter layers 203a, 203b and 203c, and the polarizer matrix 202; forming a transparent conductive layer 205 on the protective layer 204; and forming a polarizer film 206 on the second surface 201b of the substrate 201, the polarizer film 206 having a second polarization direction perpendicular to the first polarization direction.

It is appreciated that the above discussion discloses only a preferred embodiment of the present invention. Any person having ordinary skill in the art may easily find various other embodiments equivalent to the present invention. Therefore, the scope of the present invention is covered by the appended claims as set forth in the following.

What is claimed is:

1. A color filter for use in a liquid crystal display, comprising:
   a substrate having two surfaces;
   a polarizer matrix having a first polarization direction formed on one surface of said substrate and defining a plurality of openings;
   a color filter layer formed on said substrate in the openings of said polarizer matrix; and
   a polarizer film having a second polarization direction formed on another surface of said substrate;
   wherein the second polarization direction of said polarizer film is perpendicular to the first polarization direction of said polarizer matrix.

2. The color filter as recited in claim 1, wherein said polarizer matrix is made of a thin crystal film material.

3. The color filter as recited in claim 1, wherein the first polarization direction of the polarizer matrix is determined by applying a stress force, or gravitational or electromagnetic fields on said polarizer matrix.

4. The color filter as recited in claim 1, further comprising a protective layer covering said polarizer matrix and said color filter layer.

5. The color filter as recited in claim 4, further comprising a conductive layer covering said protective layer.

6. The color filter as recited in claim 5, wherein said conductive layer is made of a transparent conductive material such as indium-tin-oxide.

7. A method of manufacturing a color filter, which comprises the steps of:
   (a) providing a substrate having a first surface and a second surface;
   (b) forming a polarizer matrix on the first surface of the substrate, the polarizer matrix defining a plurality of openings and having a first polarization direction;
   c) forming a color filter layer on the substrate in the openings of the polarizer matrix; and
   d) forming a polarizer film on the second surface of the substrate, the polarizer film having a second polarization direction perpendicular to the first polarization direction of the polarizer matrix.

8. The method as recited in claim 7, wherein step (b) further comprises the step of applying a stress force or gravitational or electromagnetic fields on the polarizer matrix so as to obtain the first polarization direction.

9. The method as recited in claim 7, further comprising the following steps after step (d):
   (e) forming a protective layer covering the color filter layer and the polarizer matrix; and
   (f) forming a transparent conductive layer on the protective layer.

10. A color filter for use in a liquid crystal display device, comprising:
   a substrate, having opposite first and second surfaces;
   polarizer areas, having a first polarization direction, formed on the first surface of said substrate and defining a plurality of openings therebetween;
   a color filter layer formed at the first surface of said substrate at least in the openings of said polarizer areas; and
   a polarizer film, having a second polarization direction, formed on the second surface;
   wherein the first polarization direction of said polarizer areas is perpendicular to the second polarization direction of said polarizer film.

11. The method as recited in claim 7, wherein step (b) further comprises the step of: curing the substrate, on which the polarizer matrix has been formed, in an oven.

* * * * *